May 15, 1934. V. C. EDDLEMAN 1,959,078
PROCESS OF PRODUCING FLEXIBLE NONDETERIORATIVE INSULATION
AND METHOD OF AND APPARATUS FOR APPLYING THE SAME
Filed Aug. 16, 1932 2 Sheets-Sheet 1
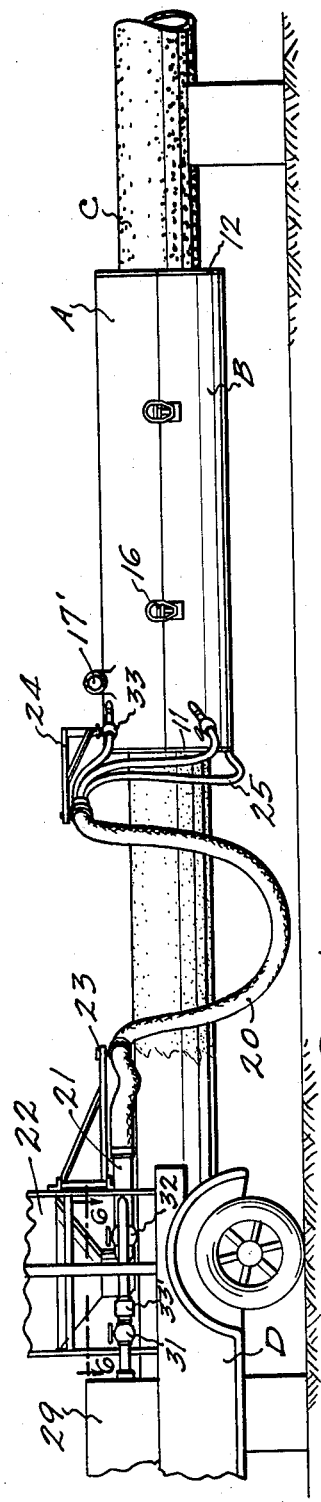
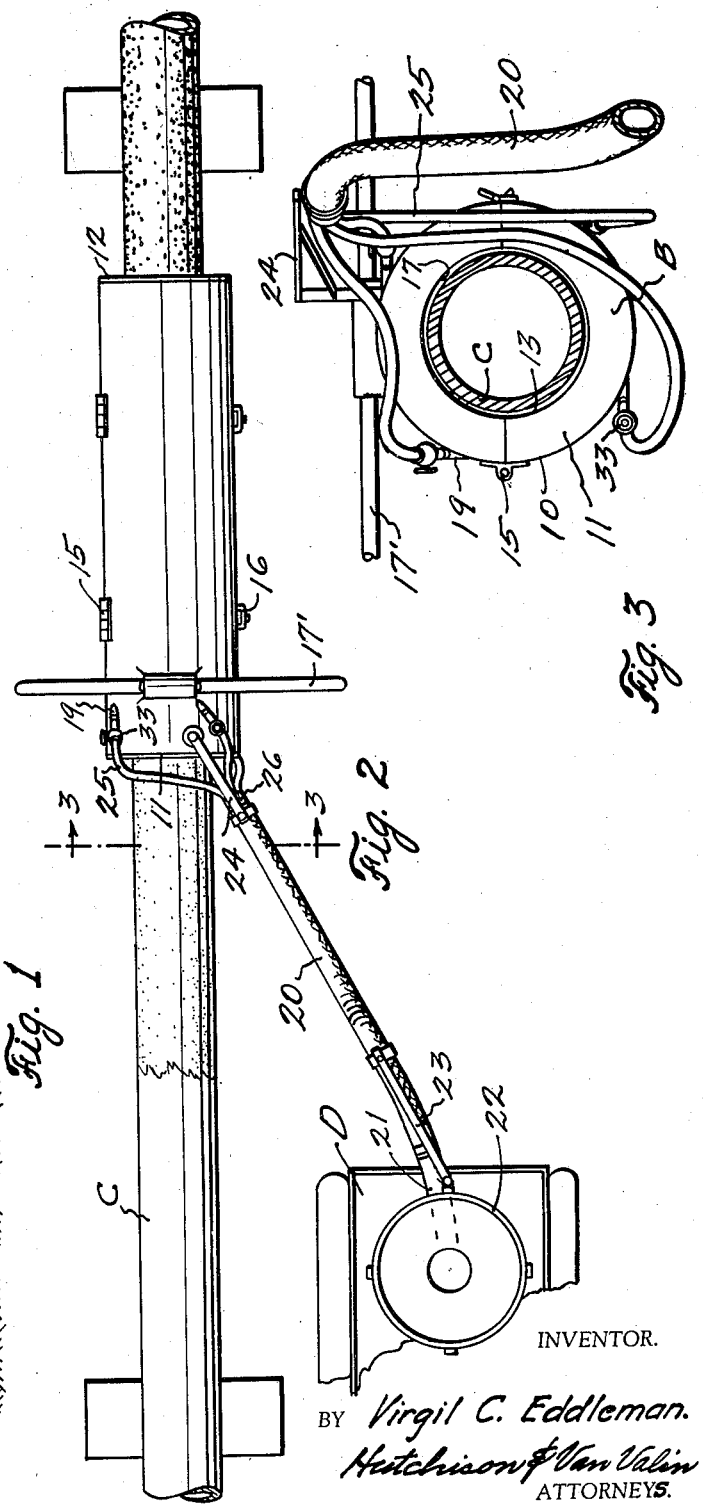
INVENTOR.
BY Virgil C. Eddleman.
Hutchison & Van Valin
ATTORNEYS.

May 15, 1934. V. C. EDDLEMAN 1,959,078
PROCESS OF PRODUCING FLEXIBLE NONDETERIORATIVE INSULATION
AND METHOD OF AND APPARATUS FOR APPLYING THE SAME
Filed Aug. 16, 1932 2 Sheets-Sheet 2
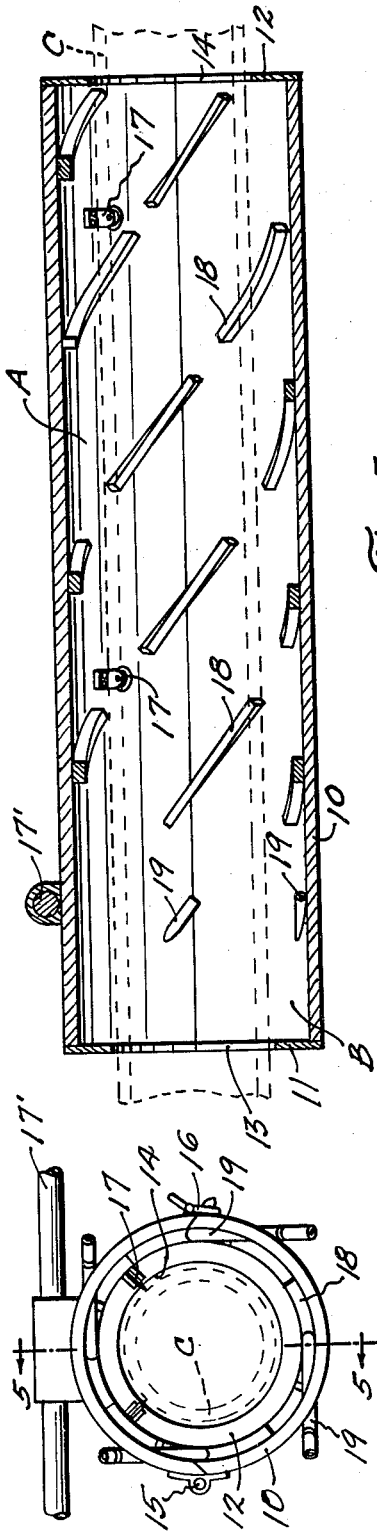
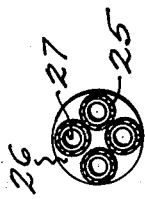
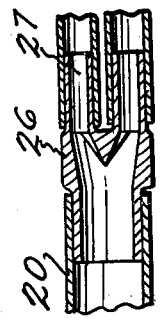
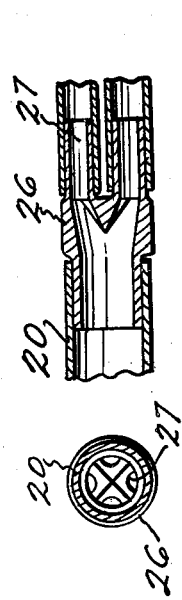
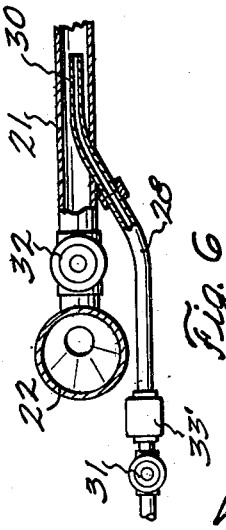
INVENTOR.
Virgil C. Eddleman
BY
Hutchison & Van Valin
ATTORNEY.

Patented May 15, 1934

1,959,078

UNITED STATES PATENT OFFICE 1,959,078

PROCESS OF PRODUCING FLEXIBLE NON-DETERIORATIVE INSULATION AND METHOD OF AND APPARATUS FOR APPLYING THE SAME

Virgil C. Eddleman, Graham, Tex., assignor of one-half to Joseph Quinton Spradlin, Dallas, Tex.

Application August 16, 1932, Serial No. 628,976

12 Claims. (Cl. 91—68)

This invention relates to new and useful improvements in processes of producing flexible non-deteriorative insulation and methods of and apparatus for applying the same.

The main object of the invention is to produce a non-deteriorative insulation which may be applied to exposed surfaces of an article for insulating and protecting the same against external deteriorative elements, thus greatly prolonging the life of said article.

A further object of the invention is to produce a non-deteriorative insulation of impervious nature and capable of expanding and contracting uniformly with the surface on which the insulation is to be applied, whereby the insulation may form an integral and permanent part of the surface when applied thereto for protecting the same irrespective of any change in position or shape of said surface.

Another object of the invention is to produce a flexible insulation which is of durable, permanent, and non-deteriorative properties and of efficient production and application.

An important object of the invention is to produce a protective insulation for under ground pipe lines and the like for insulating the same from the caustic and numerous deteriorating elements and particularly from electrolysis, thereby greatly prolonging the life of the pipe line.

The invention and other features pertaining thereto will be more readily understood from a reading of the following specifications in which an example of the process is set forth.

In carrying out the process, I use, silica, lead carbonate, litharge, and a suitable adhesive, such as paint, or the like.

These ingredients permit of certain variations and it is within the scope of the invention to vary the proportions as well as the ingredients.

I have found the following ingredients and proportions produce a very satisfactory protective insulation against external deteriorative elements, and in forming this insulation I proceed as follows:

With 21 parts of silica mix from one-half ($\frac{1}{2}$) to two (2) parts of lead carbonate. These ingredients are mixed in a dry form and as such are applied to a wet or green coating of paint or other suitable adhesive which has been previously applied to the surface. As the fluid contents of the paint evaporate or dry out the ingredients set and combine into a continuous solid film of impervious nature.

It is preferable that the mass of silica be "deadened" or "flattened" before mixing with the other ingredients. This is done by heating the mass of silica to a temperature of approximately 200 degrees Fahrenheit. This flattened condition of the mass of silica causes the particles of the same to pack more closely and thereby form a more solid, and continuous surface, than would otherwise be had.

The proportions of lead carbonate used are variable and are dependent upon the flexible properties of the surface to be protected. By varying these proportions the flexible properties of the coating may be made to correspond with those of the surface, whereby the insulation may form an integral and permanent part of said surface when applied thereto irrespective of any changes in position or shape of the same.

The first step of the process involves the heating of the mass of silica to a temperature of approximately 200 degrees Fahrenheit to "flatten" or "deaden" the same and then placing the silica and the lead carbonate in a suitable mixer for thoroughly mixing the same while in a dry state and producing a dry composition. I have found that by passing these ingredients through a series of sifting screens of graduating meshes within an aerated chamber the ingredients will be aerated as they are mixed, thereby drying the particles thereof and producing a thoroughly mixed and dry composition. This composition is then packed in moisture proof containers to retain its dry state, for use as desired.

The next step involves applying a coating of ordinary paint, as an adhesive, to the surface to be protected, and then completely covering the wet paint with an even layer of the dry composition. The final step of the process consists of allowing the coating as a whole to set or stand until dry, and during which setting action the constituents congeal and combine into a solid film of impervious nature.

It has been found that a protective coating made in accordance with this process is of permanent quality and provides a positive insulation against deteriorative elements including that of electrolysis.

The silica, which is a non-deteriorative element, forms the principal constituent of the insulation and may be used in either its natural granular form or in a pulverized state to produce either a granular or a powdered composition. Where it is desired to apply more than one coating of the insulation to a surface, it is preferable to use the granular form of the composition so as to produce a rough surface to which a subsequent coating will more readily adhere.

The lead carbonate or a suitable equivalent such as lead sulphate, both of which are non-deteriorative elements, comprises the flexible properties of the insulation and is used in variable proportions according to the flexibility desired of the same. The paint serves as a binder and adhesive for uniting the ingredients in an impervious coating and securing the same to the surface to be protected.

It is pointed out that various other types and kinds of adhesives may be used in place of paint with equal results. For instance, in the insulating of pipe lines and the like the basic sediment from oil storage tanks is desirable because of its ready and convenient supply and low cost. This basic sediment is of an asphaltic base and possesses the necessary adhesive properties to make it a suitable binder and adherent agent for the composition. When using the basic sediment in coating pipe or other metallic objects it is preferable to employ naptha or the like for cutting or thinning the sediment to the desired consistency, and when the surface to be coated is of wood, creosote is more desirable as a thinner.

While, I have described certain ingredients and proportions, the same are subject to variation. For example, in insulating metal objects such as pipe lines and the like, I have found it desirable to use the following ingredients and proportions.

With 21 parts of silica mix 2 parts of lead carbonate and 1 part of litharge. This proportion of lead carbonate has been found to provide the insulation with flexible properties corresponding to those of the pipe now commonly used. The litharge is added to the composition and acts as an auxiliary binder for promoting the permanent adhesion of the insulation to pipe or like metallic surfaces.

It is further pointed out that this protective insulation may be put to any number of various uses, such as protection for telephone poles, railroad cross ties, roofing, storage tanks, pipe lines, and other objects or surfaces exposed to deteriorative elements, for greatly increasing and prolonging the life of the same.

This invention is not only desirable for its useful and beneficial qualities but for its cheapness and low cost of production. This is evidenced by the fact that silica, which is ordinary sand with the impurities removed, is the basic and principal ingredient and may be had wherever sand is found at a very small cost as the removing of the impurities from the sand is a simple and efficient process, i. e., that of washing the sand in clear water, then drying the sand, and then washing it in the used hydrochloric acid solution which leaves pure sand or silica.

In the accompanying drawings, I have illustrated an apparatus for carrying out an efficient and convenient method, which I have discovered, for applying the insulation to the surface to be protected. This discovered method consisting in the new mode of evenly distributing the powdered composition under pressure to the wet surface which has been previously coated with the desired adhesive. This method, together with the apparatus, will be more readily understood from a reading of the following description, and by reference to the drawings, and wherein:

Fig. 1 is an elevational view showing an apparatus constructed in accordance with the invention and adapted to a pipe line or the like for applying a protective insulation to the same.

Fig. 2 is a plan view of the same,

Fig. 3 is a vertical sectional view, taken on line 3—3 of Fig. 2,

Fig. 4 is an end view of the applicator with the adjacent end plate removed,

Fig. 5 is a vertical longitudinal sectional view of the applicator, taken on line 5—5 of Fig. 4, showing the internal helical baffles and roller supports.

Fig. 6 is a horizontal sectional view of the supply control means taken on line 6—6 of Fig. 1, Figs. 7, 8 and 9 are detail views of the distribution manifold.

In the drawings the numeral 10 designates a longitudinally split cylindrical drum comprising an upper section A and a lower section B. The opposite ends of the drum are partially closed by split plates 11 and 12 which are secured to the upper and lower sections, and are provided respectively with central openings 13 and 14. The upper and lower sections of the drum are secured together at one side by hinges 15, and on the opposite side by clamps 16, so that the drum may be opened for convenient application to, or removal from, a pipe line C. The central openings 13 and 14 of the end plates are of sufficient size to provide a clearance of about ¼" intermediate the plates and the pipe for free movement of the drum longitudinally of the pipe when the said drum is mounted thereabout.

A plurality of knife-like rollers 17 are mounted within the upper section A of the drum, and ride upon the upper quarters of the pipe for movably supporting the drum and for spacing the same concentrically of the pipe. One pair of these rollers are positioned within the forward portion of the drum, and in close proximity (approximately 1 ft.) to the center thereof, while the other pair of rollers are positioned in the rear portion of the drum (approximately 1 ft. from the rear end thereof.) Such positioning of the rollers forms a semi-pivotal mounting and increases the end play intermediate the openings and the pipe, thereby enabling the drum to freely travel around the normal bends and curvatures of the pipe line without binding. The nature of the coating is such as to smooth over the thin tracks of the rollers during the setting action.

A cross-bar 17' extends transversely of the forward end of the drum, and is secured thereto for convenience in manually propelling the drum along the pipe. This drum is provided with a plurality of internal baffles 18, which are arranged in spaced helical rows, best shown in Fig. 5, around the inner wall of said drum. The baffles forming each helical row are of approximately one foot in length and are spaced apart in graduating distances, beginning approximately 6 inches from the discharge end of influent ports 19 which are spaced intermediate the row of baffles at the forward end of the drum, and decreasing about one inch apart with each spacing toward the rear of the drum. These baffles serve to deflect and break up the inflowing streams of the composition, emitting from the ports 19, into an enveloping fog or blanket, and also to guide this fog in a swirling or circular motion about the pipe as the drum is moved forwardly along said pipe, thus effecting an even distribution of the composition over the entire surface to be covered. The intermittent spacing tends to accentuate the diffusion of the inflowing streams of composition.

The pitch of the baffles or angle of deflection of the inflowing streams is governed primarily by the pressure under which said inflowing streams are admitted to the drum, the less the pressure the smaller the angle of deflection, and the greater the pressure the larger the angle of deflection. The pressure of the inflowing streams may be varied according to the speed of operation and the thickness of coating desired. The use of a 10 pound pressure with the drum moving over the surface to be covered at a slow walking speed will produce a coating of normal thickness.

For supplying the powdered composition to the drum, a flexible header 20 is connected intermediate the drum and the discharge pipe 21 of a supply hopper 22, which is shown mounted on a truck D. This header is adjustably supported at its opposite ends by pivoted brackets 23 and 24 respectively of the hopper and the drum, and is provided at its discharge end with a plurality of distribution tubes 25 which connect with the influent ports 19 of the drum.

A circular manifold 26, as best shown in Figures 7, 8 and 9, having a plurality of space discharge ports 27, connects the header and the distribution tubes and evenly distributes the composition to the tubes and likewise to the ports 19 as hereinbefore stated, these intake ports 19 are provided in spaced relation about the forward end of the drum and extend through the wall thereof for discharging the composition intermediate the rows of baffles. As shown in Figures 4 and 5, the intake ports are positioned at an angle adjacent to the inner walls of the drum and in conformity with the helical course of the baffles so that the inflowing streams of the composition will be diffused and broken up into an enveloping fog before contacting the surface of the pipe, thus producing an even and smooth protective coating of conforming thickness.

For supplying the composition under pressure to the drum, a conductor 28 leading from a suitable air compressor 29 is connected with the effluent pipe 21 of the hopper and has its discharge end 30 adapted for emitting compressed air axially of said pipe to create a flow of the composition from the hopper to the drum. Suitable control valves 31, 32 and 33 are connected respectively in the conductor 28, the pipe 21 and the distribution tubes 25 for regulating the proportions of air and the composition supplied to the drum. A pressure regulator 33', is, also, connected in the conductor 28 for maintaining the air supply at a desired pressure.

It is obvious that by adjusting these valves and by varying the consistency of the adhesive used the protective coating may be applied in various thicknesses as desired, according to the usage, handling, abuse, and such to which the coating may be put.

Furthermore, any scarred, skinned or exposed portions caused by rough handling or accidental blows, may be easily patched by an application of adhesive and composition to the exposed portion without detracting from the protection afforded by an unbroken coating.

Various changes in the size and shape of the different parts, as well as modifications and alterations may be made within the scope of the appended claims.

What I claim, is:

1. A corrosion resisting article comprising a base coated with a binder carrying a coating including a powdered mixture of silica, and a compound selected from the group consisting of lead oxide, lead sulphate, and lead carbonate.

2. A corrosion resisting article comprising a base coated with a binder carrying a coating consisting of a powdered mixture of sand, and a compound selected from the group consisting of lead oxide, lead sulphate, and lead carbonate.

3. A corrosion resisting article comprising a base coated with an initially viscous binder, said binder carrying a coating consisting of a powdered mixture of dry sand and a compound selected from the group consisting of lead oxide, lead sulphate and lead carbonate.

4. A corrosion resisting article comprising a base coated with a binder carrying a coating consisting of a powdered mixture of sand and lead carbonate.

5. A corrosion resisting article comprising a base coated with a binder carrying a coating consisting of a powdered mixture of twenty one (21) parts of dry sand, and one half ($\frac{1}{2}$) to two (2) parts of lead carbonate.

6. A corrosion resisting article comprising a base coated with a binder carrying a coating consisting of a powdered mixture of sand and lead sulphate.

7. A corrosion resisting article comprising a base coated with a binder carrying a coating consisting of a powdered mixture of sand, lead carbonate and lead oxide.

8. A corrosion resisting article comprising a base coated with a binder carrying a coating consisting of a powdered mixture of twenty one (21) parts dry sand, two (2) parts lead carbonate and one (1) part lead oxide.

9. A process of applying a corrosion resisting coating to surfaces comprising coating the surface with a layer of adhesive material, and thereafter coating the adhesive material with a powdered mixture including silica and a compound selected from a group consisting of lead oxide, lead sulphate, and lead carbonate.

10. A process of applying a corrosion resisting coating to surfaces comprising coating the surface with a layer of adhesive material, and thereafter coating the adhesive material with a powdered mixture of sand and lead carbonate.

11. A process of applying a corrosion resisting coating to surfaces comprising coating the surface with a layer of adhesive material, and thereafter coating the adhesive material with a powdered mixture of sand and lead sulphate.

12. A process of applying a corrosion resisting coating to surfaces comprising coating the surface with a layer of adhesive material, and thereafter coating the adhesive material with a powdered mixture of sand and lead carbonate and lead oxide.

VIRGIL C. EDDLEMAN.